United States Patent
Lee et al.

(10) Patent No.: US 9,595,710 B2
(45) Date of Patent: Mar. 14, 2017

(54) CATHODE ACTIVE MATERIAL FOR LITHIUM SECONDARY BATTERY AND LITHIUM SECONDARY BATTERY INCLUDING THE SAME

(71) Applicant: LG Chem, Ltd., Seoul (KR)

(72) Inventors: Hyeokmoo Lee, Daejeon (KR); Song Taek Oh, Daejeon (KR); Su Rim Lee, Daejeon (KR); JungSeok Choi, Daejeon (KR); Ji Hye Park, Daejeon (KR)

(73) Assignee: LG Chem, Ltd. (KR)

( * ) Notice: Subject to any disclaimer, the term of this patent is extended or adjusted under 35 U.S.C. 154(b) by 169 days.

(21) Appl. No.: 14/494,714

(22) Filed: Sep. 24, 2014

(65) Prior Publication Data

US 2015/0090924 A1    Apr. 2, 2015

(30) Foreign Application Priority Data

Sep. 30, 2013   (KR) .................. 10-2013-0116314

(51) Int. Cl.
  *H01M 4/36*    (2006.01)
  *H01M 4/505*    (2010.01)
  (Continued)

(52) U.S. Cl.
  CPC .......... *H01M 4/364* (2013.01); *H01M 4/505* (2013.01); *H01M 4/525* (2013.01); *H01M 4/131* (2013.01); *Y02E 60/122* (2013.01)

(58) Field of Classification Search
  None
  See application file for complete search history.

(56) References Cited

U.S. PATENT DOCUMENTS 5,872,491 A    2/1999  Kim et al.
2002/0055042 A1*  5/2002  Kweon ................ C01G 53/44
                          429/223

(Continued)

FOREIGN PATENT DOCUMENTS

KR    20100042145 A    4/2010
KR    20130001703 A    1/2013

OTHER PUBLICATIONS

Doeff, Marca M. "Battery Cathodes", Chapter 2 in Batteries for Sustainability, pp. 5-49, dated Nov. 28, 2012, published by Springer New York.*

(Continued)

*Primary Examiner* — Harold Pyon
*Assistant Examiner* — Katie L Hammer
(74) *Attorney, Agent, or Firm* — Lerner, David, Littenberg, Krumholz & Mentlik, LLP

(57) ABSTRACT

Disclosed are a cathode active material for lithium secondary batteries and a lithium secondary battery including the same and, more particularly, the present invention relates to a cathode active material for lithium secondary batteries that includes a mixture of an overlithiated transition metal oxide represented by Formula 1 below and a lithium composite transition metal oxide represented by Formula 2 below:

$$Li_{1+a}Ni_bMn_cCo_{1-(a+b+c+d)}M_dO_{2-s}A_s \quad (1)$$

$$LiNi_xMn_yCo_{1-(x+y+z)}M'_zO_{2-t}A'_t \quad (2)$$

wherein $0.1 \leq a \leq 0.2$, $0.1 \leq b \leq 0.4$, $0.3 \leq c \leq 0.7$, $0 \leq d \leq 0.1$, $0.5 \leq x \leq 0.8$, $0.1 \leq y \leq 0.4$, $0 \leq z \leq 0.1$, $0 \leq s < 0.2$, and $0 \leq t < 0.2$;

M and M' are each independently at least one divalent or trivalent metal; and

A and A' are each independently at least one monovalent or divalent anion.

15 Claims, 1 Drawing Sheet

(51) Int. Cl.
  *H01M 4/525*   (2010.01)
  *H01M 4/131*   (2010.01)

(56) References Cited

U.S. PATENT DOCUMENTS

| | | | |
|---|---|---|---|
| 2007/0037056 A1* | 2/2007 | Kitao | H01M 4/131 |
| | | | 429/231.1 |
| 2011/0171529 A1 | 7/2011 | Kono et al. | |
| 2011/0315918 A1 | 12/2011 | Kawai et al. | |
| 2012/0141873 A1* | 6/2012 | Kim | H01M 4/131 |
| | | | 429/220 |
| 2012/0248388 A1 | 10/2012 | Nagai et al. | |
| 2013/0236780 A1 | 9/2013 | Yokote et al. | |

OTHER PUBLICATIONS

Yoshio, Masaki, et al., "Preparation and properties of $LiCo_yMn_xNi_{1-x-y}O_2$ as a cathode for lithium ion batteries." Journal of Power Sources, vol. 90 (2000), pp. 176-181.

* cited by examiner

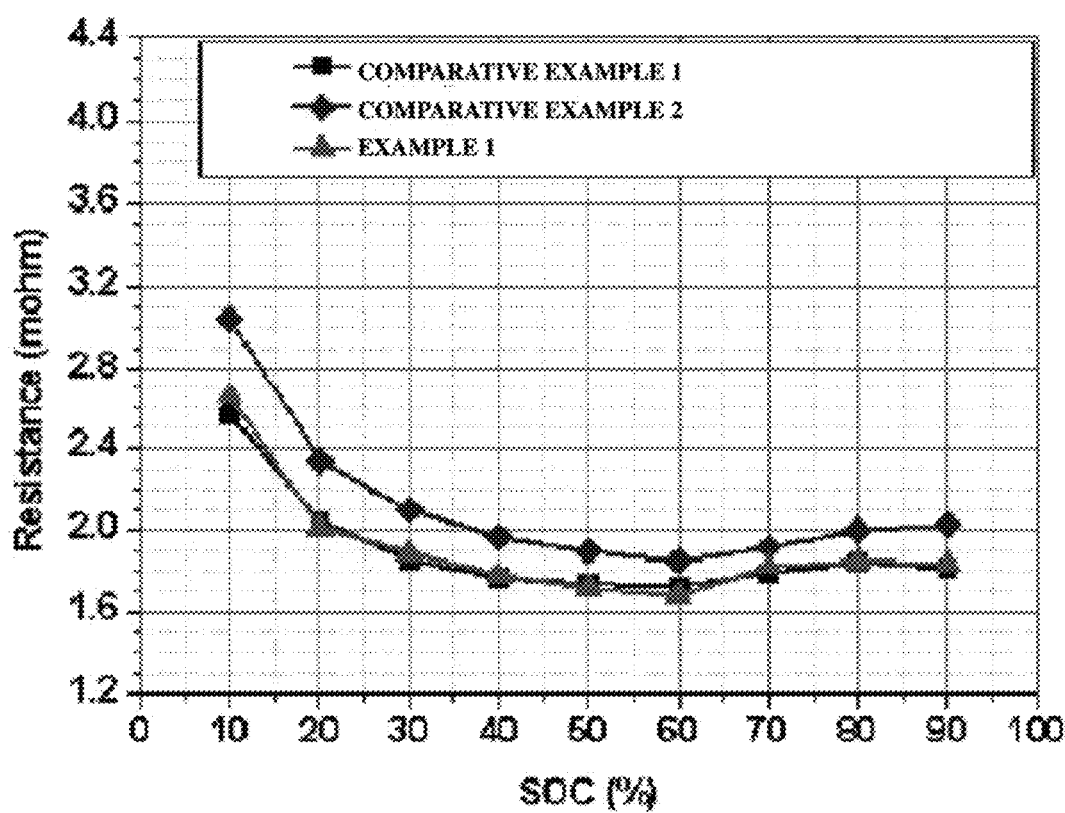

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATIONS

The present application claims priority from Korean Patent Application No. 10-2013-0116314 filed Sep. 30, 2013, the disclosure of which is hereby incorporated herein by reference.

TECHNICAL FIELD

The present invention relates to a cathode active material for lithium secondary batteries and a lithium secondary battery including the same and, more particularly, to a cathode active material for lithium secondary batteries that includes a mixture of two kinds of particular compounds and a lithium secondary battery including the same.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride (Ni-MH) secondary battery is mainly used. However, research into lithium secondary batteries having high energy density, high discharge voltage and output stability is actively underway and some lithium secondary batteries are commercially available.

As cathode active materials for lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure, and the like and lithium-containing nickel oxides such as $LiNiO_2$ is also under consideration.

Among these cathode active materials, $LiCoO_2$ is widely used due to excellent lifespan characteristics and charge and discharge efficiencies. However, $LiCoO_2$ is low in safety at high temperature and expensive due to resource limitations of cobalt as a raw material and thus there is limitation in price competitiveness.

Meanwhile, lithium manganese oxides, such as $LiMnO_2$, $LiMnO_4$, and the like, are advantageous in that they have high thermal safety and are inexpensive and easy to synthesize. However, such lithium manganese oxides have low capacity, poor high-temperature characteristics, and low conductivity.

In addition, lithium nickel-based oxides such as $LiNiO_2$ as a cathode active material are relatively cheap and exhibit high discharge capacity. However, crystal structures of these cathode active materials undergo rapid phase transition according to changes in volume caused during charging and discharging cycles and, when exposed to air and moisture, stability of these cathode active materials is rapidly reduced.

Thus, nickel-based lithium transition metal oxides, nickel of which is partially substituted with other transition metals such as manganese, cobalt, and the like, have recently been proposed as an alternative. These nickel-based lithium transition metal oxides substituted with other metals exhibit relatively excellent cycle characteristics and capacity characteristics. However, when such lithium transition metal oxides are used for a long period of time, cycle characteristics thereof are dramatically deteriorated and problems, such as swelling due to generation of gases in a battery, reduction in thermal safety according to low chemical stability, and the like, have yet to be addressed.

To address the problems described above, technology of using a cathode active material including a lithium transition metal oxide containing an excess of lithium is disclosed. In this case, however, capacity and output characteristics are poor, an electrolyte decomposes by pH changes due to lithium byproducts (e.g., LiOH, $LiCO_2$, and the like) according to an excess of lithium, and resistance increases.

Therefore, there is an urgent need to develop a cathode active material that exhibits enhanced capacity and output characteristics and addresses thermal safety problems.

DISCLOSURE

Technical Problem

Therefore, the present invention has been made to solve the above and other technical problems that have yet to be resolved.

As a result of a variety of extensive and intensive studies and experiments, the inventors of the present invention confirmed that, as described below, when a mixture of an overlithiated transition metal oxide represented by a particular chemical formula and a lithium composite transition metal oxide is used as a cathode active material for secondary batteries, the mixture thereof may enhance safety, capacity and output characteristics of a secondary battery, thus completing the present invention.

Technical Solution

In accordance with one aspect of the present invention, provided is a cathode active material for lithium secondary batteries that includes a mixture of an overlithiated transition metal oxide represented by Formula 1 below and a lithium composite transition metal oxide represented by Formula 2 below:

$$Li_{1+a}Ni_bMn_cCo_{1-(a+b+c+d)}M_dO_{2-s}A_s \qquad (1)$$

$$LiNi_xMn_yCo_{1-(x+y+z)}M'_zO_{2-t}A'_t \qquad (2)$$

wherein $0.1 \leq a \leq 0.2$, $0.1 \leq b \leq 0.4$, $0.3 \leq c \leq 0.7$, $0 \leq d \leq 0.1$, $0.5 \leq x \leq 0.8$, $0.1 \leq y \leq 0.4$, $0 \leq z \leq 0.1$, $0 \leq s \leq 0.2$, and $0 \leq t \leq 0.2$;

M and M' are each independently at least one divalent or trivalent metal; and

A and A' are each independently at least one monovalent or divalent anion.

In general, cathode active materials undergo irreversible changes in crystal structure during charging or undergo side reaction in which elution of a transition metal and oxygen release occur simultaneously.

This is attributed to reduction in structural stability. An excess of lithium of an overlithiated transition metal oxide contributes to structural stability, thus addressing the problems described above. However, as described above, the overlithiated transition metal oxide increases resistance of an electrode due to byproducts of lithium and thus output characteristics are deteriorated and capacity is reduced. On the other hand, a lithium composite transition metal oxide containing an excess of nickel exhibits relatively poor structural stability, while having relatively excellent capacity and resistance/output characteristics.

Thus, the inventors of the present invention carried out various experiments and confirmed that, when a cathode active material including the two kinds of compounds of the particular chemical formulas above is used, the overlithiated transition metal oxide of Formula 1 and the lithium composite transition metal oxide of Formula 2 containing an excess of nickel mutually complement their disadvantages and exhibit their own advantages although interaction therebetween cannot be clearly explained and thus may exhibit high capacity and excellent output characteristics and maintain thermal safety.

Hereinafter, the present invention will be described in more detail.

The overlithiated transition metal oxide of Formula 1 includes a relatively large amount of Mn and thus may further enhance structural stability. In this regard, a molar fraction c of Mn may be 0.3 to 0.7 ($0.3 \leq c \leq 0.7$), which is a greater amount than amounts of Ni and Co, in particular 0.4 to 0.6 ($0.4 \leq c \leq 0.6$). When the molar fraction of Mn is less than 0.3, it is difficult to achieve higher structural stability. On the other hand, when the molar fraction of Mn exceeds 0.7, capacity is significantly reduced.

Meanwhile, the lithium composite transition metal oxide of Formula 2 includes an excess of Ni and may thus maximize capacity. In this regard, a molar fraction x of Ni may be 0.5 to 0.8 ($0.5 \leq x \leq 0.8$), in particular 0.5 to 0.6 ($0.5 \leq x \leq 0.6$). When the molar fraction of Ni is less than 0.5, it is difficult to achieve high capacity. On the other hand, when the molar fraction of Ni exceeds 0.8, structural stability in cycles is very low.

In addition, in the overlithiated transition metal oxide of Formula 1 and the lithium composite transition metal oxide of Formula 2, at least one of transition metals such as Ni, Mn, and Co may be substituted with at least one divalent or trivalent metal (M and M') within a predetermined range. The metal may, for example, be at least one selected from the group consisting of B, Mg, Al, Ca, Sr, Cr, Cu, Fe, Ti, Y, and Zn.

In addition, in the overlithiated transition metal oxide of Formula 1 and the lithium composite transition metal oxide of Formula 2, an oxygen (O) ion may be substituted with a monovalent or divalent anion (A and A') within a predetermined range. The anion may, for example, be at least one selected from the group consisting of F, Cl, Br, and S.

Substitution of these anions enables high binding ability with the transition metals and prevents structural transition of the cathode active material, whereby the lithium secondary battery may have enhanced lifespan. On the other hand, when a substitution amount of the anion is too high (0.2 molar ratio or greater based on a total of anions), the lifespan of the lithium secondary battery may be deteriorated because the compounds are unable to maintain a stable structure. Thus, the substitution amount of the anion may be 0 to 0.2 molar ratio, more particularly 0.01 to 0.1 molar ratio, based on a total of anions.

The cathode active material according to the present invention includes a mixture of the overlithiated transition metal oxide of Formula 1 that exhibits thermal stability and the lithium composite transition metal oxide of Formula 2 that exhibits high capacity and high output. In this regard, a mix ratio of the two compounds may be 30:70 to 70:30, more particularly 40:60 to 60:40, on a weight ratio basis.

When the amount of the overlithiated transition metal oxide of Formula 1 is too small and the lithium composite transition metal oxide of Formula 2 is too great, the mixture exhibits high capacity and high output, but the battery has reduced thermal safety and structural stability. When the amount of the overlithiated transition metal oxide of Formula 1 is too great and the lithium composite transition metal oxide of Formula 2 is too small, battery thermal safety may be secured, but desired capacity and output characteristics may not be obtained.

The present invention also provides a cathode including the cathode active material and a lithium secondary battery including the cathode.

In this regard, an operating voltage of the lithium secondary battery may be 2.5 V to 4.6 V, in particular 2.5 V to 4.25 V. This indicates that battery safety is enhanced due to structural stability of the overlithiated transition metal oxide of Formula 1 and, accordingly, the battery may operate at relatively high voltage. Thus, the operating voltage of the lithium secondary battery according to the present invention may have an upper limit of 4.25 V to 4.6 V and, in particular, may have an upper limit of 4.3 V to 4.35 V in consideration of the stability of the lithium composite transition metal oxide of Formula 2.

The lithium secondary battery includes the cathode, an anode, a separator, and a lithium salt-containing non-aqueous electrolyte.

The cathode is manufactured by, for example, coating, on a cathode current collector, a slurry made of a mixture of the cathode active material according to the present invention, a conductive material, and a binder and drying the coated cathode current collector. As desired, the mixture (electrode mixture) of the cathode active material, a conductive material, a binder, and the like may further include at least one material selected from the group consisting of a viscosity modifier and a filler.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is a component to further enhance conductivity of an electrode active material. The conductive material may be added in an amount of 0.01 to 30 wt % based on the total weight of the electrode mixture. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; carbon derivatives such as carbon nanotubes and fullerene; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to the cathode current collector. The binder is typically added in an amount of 1 to 50 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The viscosity modifier is a component to adjust the viscosity of the electrode mixture so as to facilitate mixing of the electrode mixture and coating thereof on a current collector and may be added in an amount of 30 wt % based on the total weight of the electrode mixture. Examples of the viscosity modifier include, but are not limited to, carboxymethylcellulose and polyvinylidene fluoride. In some cases, the above-described solvent may also act as a viscosity modifier.

The filler is optionally used as an auxiliary component to inhibit electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode is manufactured by coating an anode material on an anode current collector and drying the coated anode current collector. As desired, the anode material may further include the components described above such as a conductive material, a binder, and the like.

The anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, aluminum-cadmium alloys, or the like. As in the cathode current collector, the anode current collector may also have fine irregularities at a surface thereof to enhance adhesion between the anode current collector and an anode active material. In addition, the anode current collector may be used in various forms including films, sheets, foils, nets, porous structures, foams, and non-woven fabrics.

The anode active material may, for example, be carbon and graphite materials such as natural graphite, artificial graphite, expandable graphite, carbon fiber, hard carbon, carbon black, carbon nanotubes, fullerene, and activated carbon; metals alloyable with lithium such as Al, Si, Sn, Ag, Bi, Mg, Zn, In, Ge, Pb, Pd, Pt, Ti, and the like and compounds including these elements; complexes of metals and compounds thereof and complexes of carbon and graphite materials; and lithium-containing nitrides. Among these, a carbon-based active material, a silicon-based active material, a tin-based active material, or a silicon-carbon-based active material may be used. These materials may be used alone or at least two thereof may be used in combination.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as a separator.

The lithium salt-containing non-aqueous electrolyte is composed of a non-aqueous electrolyte and a lithium salt. As the non-aqueous electrolyte, a non-aqueous electrolytic solution, an organic solid electrolyte, an inorganic solid electrolyte, or the like may be used.

For example, the non-aqueous electrolytic solution may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The present invention also provides a battery module including the lithium secondary battery as a unit battery and a battery pack including the battery module.

The battery pack may be used as a power source of devices that require high capacity, excellent output characteristics, battery safety, and the like, and examples of the devices include, but are not limited to, small devices such as computers, mobile phones, and power tools, and medium and large devices including: electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

Effects of Invention

As described above, a cathode active material for lithium secondary batteries according to the present invention includes a mixture of an overlithiated transition metal oxide represented by a particular chemical formula and a lithium composite transition metal oxide having a particular composition and thus a lithium secondary battery including the cathode active material may secure safety and have high capacity and excellent output characteristics.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph showing measurement results of resistance characteristics according to Experimental Example 1.

BEST MODE

Now, the present invention will be described in more detail with reference to the following examples. These examples are provided only for illustration of the present invention and should not be construed as limiting the scope and spirit of the present invention.

Example 1

A cathode active material including $Li_{1.1}Ni_{0.25}Mn_{0.4}Co_{0.25}O_2$ and $LiNi_{0.5}Mn_{0.3}Co_{0.2}O_2$ in a weight ratio of 50:50, a conductive material, and PVdF as a binder were added in a weight ratio of 90:5:5 (active material: conductive material: binder) to N-methyl-2-pyrrolidone (NMP) as a solvent to prepare a cathode mixture slurry. Subsequently, 95 wt % of artificial graphite as an anode active material, 1.5 wt % of Super-P as a conductive material, and 3.5 wt % of PVdF as a binder were added to NMP as a solvent to prepare an anode mixture slurry. The cathode mixture slurry and the anode mixture slurry were respectively coated onto Al foil and Cu foil, dried, and pressed, thereby completing fabrication of a cathode and an anode.

Thereafter, a porous polyethylene separator was interposed between the cathode and the anode and an electrolyte containing 1M $LiPF_6$ in a mixed carbonate solvent of EC and EMC in a volume ratio of 1:2 was injected thereinto, thereby completing manufacture of a battery.

Example 2

A battery was manufactured in the same manner as in Example 1, except that the ratio of the two compounds as the cathode active material was 70:30 on a weight ratio basis.

Example 3

A battery was manufactured in the same manner as in Example 1, except that the ratio of the two compounds as the cathode active material was 30:70 on a weight ratio basis.

Comparative Example 1

A battery was manufactured in the same manner as in Example 1, except that $LiNi_{0.5}Mn_{0.3}Co_{0.2}O_2$ was used alone as a cathode active material.

Comparative Example 2

A battery was manufactured in the same manner as in Example 1, except that $Li_{1.1}Ni_{0.25}Mn_{0.4}Co_{0.25}O_2$ was used alone as a cathode active material.

Experimental Example 1

Each of the batteries manufactured according to Example 1 and Comparative Examples 1 and 2 was discharged in a state of charge (SOC) of 10% to 90% at 120 mA for 10 seconds and resistance of each battery was measured. Results are illustrated in FIG. 1.

Referring to FIG. 1, it can be confirmed that, while the overlithiated transition metal oxide used as a cathode active material in Comparative Example 2 exhibits relatively high battery resistance over the whole range of SOC, the mixture of the overlithiated transition metal oxide and the lithium composite transition metal oxide ($LiNi_{0.5}Mn_{0.3}Co_{0.2}O_2$) used in Example 1 has low resistance that is similar to that in a case in which the lithium composite transition metal oxide was used alone as in Comparative Example 1.

Experimental Example 2

The batteries of Examples 1 to 3 and Comparative Examples 1 and 2 were charged at 0.1 C until the voltage reached 4.3 V and exothermic onset temperature, maximum exothermic temperature, and calorific value of each battery were measured using a differential scanning calorimeter (DSC). Results are shown in Table 1 below.

TABLE 1

| | Onset temperature (° C.) | Main peak (° C.) | Calorific value (J/g) |
|---|---|---|---|
| Example 1 | 256 | 280 | 1,097 |
| Example 2 | 260 | 290 | 1,080 |
| Example 3 | 253 | 275 | 1,081 |
| Comparative Example 1 | 248 | 256 | 1,082 |
| Comparative Example 2 | 263 | 297 | 1,097 |

Referring to Table 1, it can be confirmed that, as compared to the battery of Comparative Example 1 using the lithium composite transition metal oxide alone, the batteries of Examples 1 to 3 exhibit exothermic onset temperature and maximum exothermic temperature similar to those of the battery of Comparative Example 2 using the overlithiated transition metal oxide alone and higher than those of the battery of Comparative Example 1. This means that, when a mixture of the overlithiated transition metal oxide and the lithium composite transition metal oxide is used, time at which exothermic reaction of an active material occurs may be delayed or prevented as compared to a case in which the lithium composite transition metal oxide is used alone and, accordingly, battery safety is enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a lithium secondary battery, consisting of a mixture of an overlithiated transition metal oxide represented by Formula (1) below and a lithium composite transition metal oxide represented by Formula (2) below:

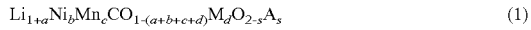  (1)

  (2)

wherein $0.1 \leq a \leq 0.2$, $0.1 \leq b \leq 0.4$, $0.3 \leq c \leq 0.7$, $0 \leq d \leq 0.1$, $0.5 \leq x \leq 0.8$, $0.1 \leq y \leq 0.4$, $0 \leq z \leq 0.1$, $0 \leq s < 0.2$, and $0 \leq t < 0.2$;

M and M' are each independently at least one divalent or trivalent metal; and

A and A' are each independently at least one monovalent or divalent anion.

2. The cathode active material according to claim 1, wherein a molar fraction c of Mn of the overlithiated transition metal oxide satisfies the following condition: $0.4 \leq c \leq 0.6$.

3. The cathode active material according to claim 1, wherein a molar fraction x of Ni of the lithium composite transition metal oxide satisfies the following condition: $0.5 \leq x \leq 0.6$.

4. The cathode active material according to claim 1, wherein M and M' are each independently at least one selected from the group consisting of B, Mg, Al, Ca, Sr, Cr, Cu, Fe, Ti, Y, and Zn.

5. The cathode active material according to claim 1, wherein A and A' are each independently at least one selected from the group consisting of F, Cl, Br, and S.

6. The cathode active material according to claim 1, wherein a mix ratio of the overlithiated transition metal oxide to the lithium composite transition metal oxide is 30:70 to 70:30 on a weight ratio basis.

7. The cathode active material according to claim 4, wherein a mix ratio of the overlithiated transition metal oxide to the lithium composite transition metal oxide is 40:60 to 60:40 on a weight ratio basis.

8. A cathode comprising the cathode active material according to claim 1.

9. A lithium secondary battery comprising the cathode according to claim 8.

10. The lithium secondary battery according to claim 9, wherein an operating voltage of the lithium secondary battery has an upper limit of 4.25 V to 4.6 V.

11. The lithium secondary battery according to claim 10, wherein the operating voltage of the lithium secondary battery has an upper limit of 4.3 V to 4.35 V.

12. A battery module comprising the lithium secondary battery according to claim 9 as a unit battery.

13. A battery pack comprising the battery module according to claim 12.

14. A device using the battery pack according to claim 13 as a power source.

15. The device according to claim 14, wherein the device is a computer, a mobile phone, a power tool, an electric vehicle (EV), a hybrid electric vehicle (HEV), a plug-in hybrid electric vehicle (PHEV), an electric two-wheeled vehicle, an electric golf cart, or a system for storing power.

* * * * *